US011250400B2

United States Patent
Kasumi (10) Patent No.: US 11,250,400 B2
(45) Date of Patent: Feb. 15, 2022

(54) AUDIO SIGNAL CONTROL APPARATUS AND METHOD THEREOF

(71) Applicant: TOSHIBA TEC KABUSHIKI KAISHA, Tokyo (JP)

(72) Inventor: Naoki Kasumi, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 378 days.

(21) Appl. No.: 16/253,742

(22) Filed: Jan. 22, 2019

(65) Prior Publication Data

US 2019/0228395 A1  Jul. 25, 2019

(30) Foreign Application Priority Data

Jan. 24, 2018  (JP) .............................. JP2018-009571

(51) Int. Cl.
*H04R 3/00* (2006.01)
*G06Q 20/20* (2012.01)
*H04R 3/04* (2006.01)
*H04R 1/28* (2006.01)
*H04R 1/22* (2006.01)
*G07G 1/00* (2006.01)
(Continued)

(52) U.S. Cl.
CPC ......... *G06Q 20/20* (2013.01); *G06Q 20/3272* (2013.01); *G07G 1/0045* (2013.01); *H04R 1/222* (2013.01); *H04R 1/2803* (2013.01); *H04R 3/04* (2013.01); *G06K 7/10821* (2013.01)

(58) Field of Classification Search
CPC .. G06Q 20/20; G06Q 20/3272; G07G 1/0045; H04R 3/04; H04R 1/2803; H04R 1/222; H04R 2205/041; G06K 7/10821

USPC ...................................... 181/175; 381/91, 92
See application file for complete search history.

(56) References Cited

U.S. PATENT DOCUMENTS

2005/0013443 A1\* 1/2005 Marumoto ............. H03G 9/005
381/56
2019/0311343 A1\* 10/2019 Cantrell ................ H04L 9/3297

FOREIGN PATENT DOCUMENTS

JP   H11-144149 A   5/1999
JP   2010-015426 A  1/2010
(Continued)

OTHER PUBLICATIONS

Japanese Notice of Reasons for Refusal dated Aug. 31, 2021 in corresponding Japanese Patent Application No. 2018-009571, 6 pages (with Translation).

*Primary Examiner* — Ammar T Hamid
(74) *Attorney, Agent, or Firm* — Kim & Stewart LLP (57) ABSTRACT

An audio signal control apparatus includes a sound input circuit, a sound output circuit, and a control circuit. The sound input circuit is configured to receive an ambient sound signal from a microphone that captures ambient sound. The sound output circuit is configured to generate an output sound signal and transmit the output sound signal to a speaker to generate sound based on the output sound signal. The control circuit is configured to determine characteristics of the ambient sound based on the ambient sound signal received by the sound input circuit, determine a frequency band of the sound to be generated by the speaker based on the characteristics of the ambient sound, and control the sound output circuit to generate an output sound signal corresponding to the sound of the determined frequency band.

20 Claims, 6 Drawing Sheets

(51) Int. Cl.
*G06Q 20/32* (2012.01)
*H04R 1/02* (2006.01)
*G06K 7/10* (2006.01)

(56) References Cited

FOREIGN PATENT DOCUMENTS

| | | | |
|---|---|---|---|
| JP | 4714861 | B2 * | 6/2011 |
| JP | 2011-186757 | A | 9/2011 |
| JP | 2012-022470 | A | 2/2012 |
| JP | 2017-107464 | A | 6/2017 |

* cited by examiner

| ATTRIBUTE | | | | | |
|---|---|---|---|---|---|
| AGE | | DISABILITY | | | ... |
| LESS THAN 60 YEARS | 60 YEARS OR MORE | NONE | HEARING DIFFICULTY AT TREBLE | HEARING DIFFICULTY AT BASS | ... |
| NO CHANGE | RAISE BY LEVEL 2 | NO CHANGE | LOWER BY LEVEL 3 | RAISE BY LEVEL 3 | ... |

| 7 TO 12 O'CLOCK | 13 TO 17 O'CLOCK | 18 TO 22 O'CLOCK |
|---|---|---|
| RAISE BY LEVEL 1 | NO CHANGE | NO CHANGE |

AUDIO SIGNAL CONTROL APPARATUS AND METHOD THEREOF

CROSS-REFERENCE TO RELATED APPLICATION

This application is based upon and claims the benefit of priority from Japanese Patent Application No. 2018-009571, filed on Jan. 24, 2018, the entire contents of which are incorporated herein by reference.

FIELD

Embodiments described herein relate generally to an audio signal control apparatus and a method thereof.

BACKGROUND

In the related art, a device such as a point of sales (POS) terminal used in a store can be used for setting a volume of sound to be output by the POS terminal. When there is too much noise, for example, at a busy time, an operator such as a clerk changes a volume setting such as setting the volume to be larger to make the sound recognizable.

However, since the operator executes commodity registration or accounting, it is cumbersome to change the volume setting depending on the noise. In addition, if a plurality of operators set the volume of devices to be larger, the ambient noise may further increase.

DETAILED DESCRIPTION

Embodiments provide an audio signal control apparatus capable of generating a sound signal of a sound characteristic corresponding to an ambient noise and a method thereof.

In general, according to an embodiment, an audio signal control apparatus includes a sound input circuit, a sound output circuit, and a control circuit. The sound input circuit is configured to receive an ambient sound signal from a microphone that captures ambient sound. The sound output circuit is configured to generate an output sound signal and transmit the output sound signal to a speaker to generate sound based on the output sound signal. The control circuit is configured to determine characteristics of the ambient sound based on the ambient sound signal received by the sound input circuit, determine a frequency band of the sound to be generated by the speaker based on the characteristics of the ambient sound, and control the sound output circuit to generate an output sound signal corresponding to the sound of the determined frequency band.

Hereinafter, an embodiment of an audio signal control apparatus and a method thereof will be described in detail with reference to the drawings. The embodiment to be described is merely one embodiment of an audio signal control apparatus and a method thereof, and is not intended to limit configurations or specifications of the audio signal control apparatus. The audio control apparatus and the method thereof in the embodiment is an application example to a commodity registration device in a checkout system which executes commodity registration by reading a commodity code assigned to each commodity in a store such as a supermarket, for example.

Figure 1:
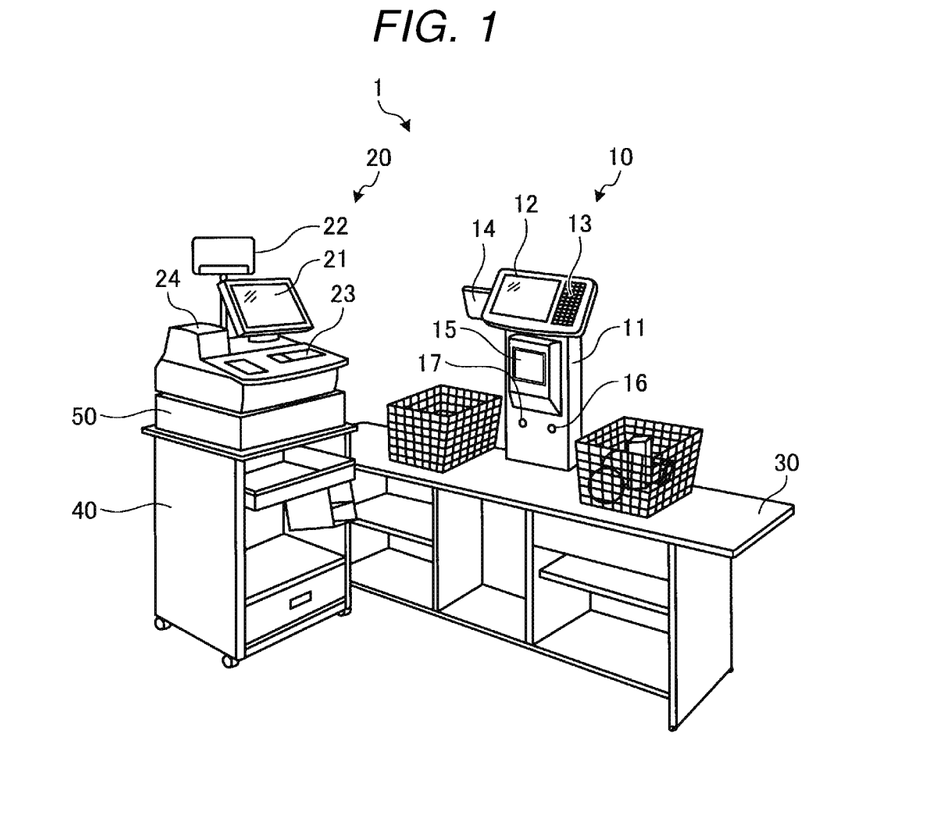
FIG. 1 illustrates a perspective view of an example of a checkout system according to an embodiment.

FIG. 1 illustrates a perspective view of an example of a checkout system 1 according to an embodiment. The checkout system 1 includes a commodity registration device 10 and a POS terminal 20. The commodity registration device 10 and the POS terminal 20 are connected to each other to be communicable. In the checkout system 1 illustrated in FIG. 1, an operator such as a clerk stands on a side of the commodity registration device 10 where the POS terminal 20 is located and a counter table 30 is located between oneself and a customer to operate the commodity registration device 10. On the other hand, it is assumed that the customer stands on the opposite side of the commodity registration device 10 to wait for the commodity registration.

The commodity registration device 10 is a device for registering a commodity that is a sale target by reading a commodity code assigned to each commodity and identifies the commodity. The commodity registration device 10 is placed on the counter table 30. The commodity registration device 10 includes a thin rectangular housing 11.

The commodity registration device 10 includes a first display unit 12 and an operation unit 13 in an upper portion of the housing 11. The first display unit 12 is, for example, a liquid crystal display (LCD) device on which a touch panel is stacked. The first display unit 12 displays, for example, various kinds of information toward the operator such as a clerk. The operation unit 13 is an input device which receives an operation such as a keyboard.

The commodity registration device 10 includes a second display unit 14 on the back side of the first display unit 12. The second display unit 14 is, for example, a liquid crystal display device on which a touch panel is stacked. The second display unit 14 displays, for example, various kinds of information toward the customer and the like.

The commodity registration device 10 includes a reading window 15 on the operator side in the housing 11. The commodity registration device 10 includes a scanner 104 (see FIG. 3) inside the reading window 15. The reading window 15 is formed of a plate capable of transmitting light. The scanner 104 irradiates light toward the outside of the reading window 15. The scanner 104 receives the light reflected from the irradiated light. Accordingly, the scanner 104 reads out a code symbol or the like assigned to an article held in front of the reading window 15.

The commodity registration device 10 includes a first opening 16 and a second opening 17 downward the reading window 15 that is on the operator side in the housing 11. The commodity registration device 10 includes a first sound detecting unit 105 (see FIG. 3) inside the first opening 16.

The first sound detecting unit 105 is a microphone which captures the sound around the operator side of the commodity registration device 10 and converts the captured sound into an electric signal. The commodity registration device 10 includes a first sound output unit 106 (see FIG. 3) inside the second opening 17. The first sound output unit 106 is a speaker which outputs sound to the commodity registration device 10 on the operator side. The first sound output unit 106 outputs sound of a characteristic corresponding to the ambient sound on the operator side captured by the first sound detecting unit 105 associated with the first sound output unit 106. For example, the first sound output unit 106 outputs sound of a frequency band different from a frequency band of the ambient sound captured by the first sound detecting unit 105. Positions of the first opening 16 and the first sound detecting unit 105 illustrated in FIG. 1 are merely examples and may be changed to arbitrary positions. The commodity registration device 10 illustrated in FIG. 1 includes one first opening 16 and one first sound detecting unit 105, but may include an arbitrary number of openings and sound detecting units.

The POS terminal 20 is a device for checking out commodities registered by the commodity registration device 10. The POS terminal 20 is disposed on a drawer 50 placed on a base 40 disposed near the end portion of the counter table 30. The drawer 50 accommodates coins and bills.

The POS terminal 20 includes a first display unit 21, a second display unit 22, an operation unit 23, and a printing unit 24. The first display unit 21 is a liquid crystal display (LCD) device which displays various kinds of information to the operator such as the clerk. The second display unit 22 is a liquid crystal display (LCD) device which displays various kinds of information to the customer and the like. The operation unit 23 is an input device which receives various kinds of operations such as a keyboard. The printing unit 24 is, for example, a printer which prints a receipt or the like.

Figure 2:
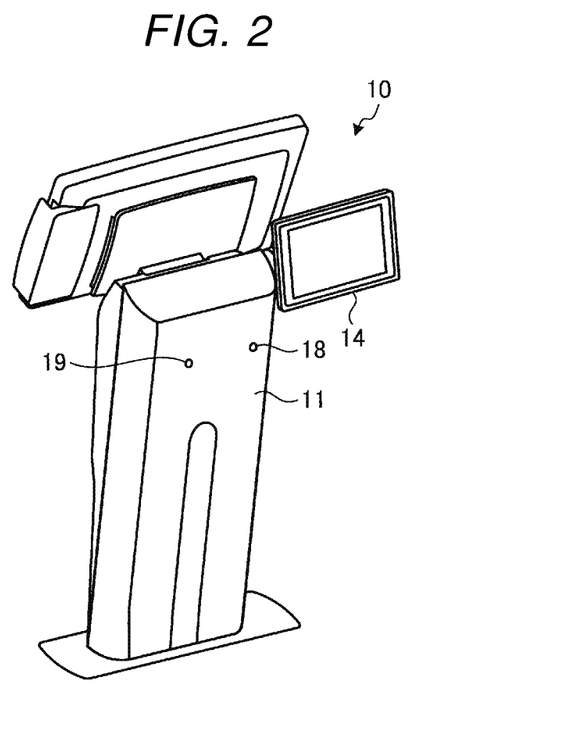
FIG. 2 illustrates a perspective view of an example of a commodity registration device viewed from a customer side.

FIG. 2 illustrates a perspective view of an example of the commodity registration device 10 viewed from the customer side. The commodity registration device 10 includes a third opening 18 and a fourth opening 19 on the customer side in the housing 11. The commodity registration device 10 includes a second sound detecting unit 107 (see FIG. 3) inside the third opening 18. The second sound detecting unit 107 is a microphone which captures the sound around the customer side of the commodity registration device 10 and converts the captured sound into an electric signal. The commodity registration device 10 includes a second sound output unit 108 (see FIG. 3) inside the fourth opening 19. The second sound output unit 108 is a speaker which outputs sound toward the customer side of the commodity registration device 10. The second sound output unit 108 outputs sound of a characteristic corresponding to the ambient sound on the customer side captured by the second sound detecting unit 107 associated with the second sound output unit 108. For example, the second sound output unit 108 outputs sound of a frequency band different from a frequency band of the ambient sound captured by the second sound detecting unit 107. Positions of the third opening 18 and the second sound detecting unit 107 illustrated in FIG. 2 are merely examples and may be changed to arbitrary positions. The commodity registration device 10 illustrated in FIG. 2 includes one third opening 18 and one second sound detecting unit 107, but may include an arbitrary number of openings and sound detecting units.

Next, the hardware configuration of the commodity registration device 10 will be described.

Figure 3:
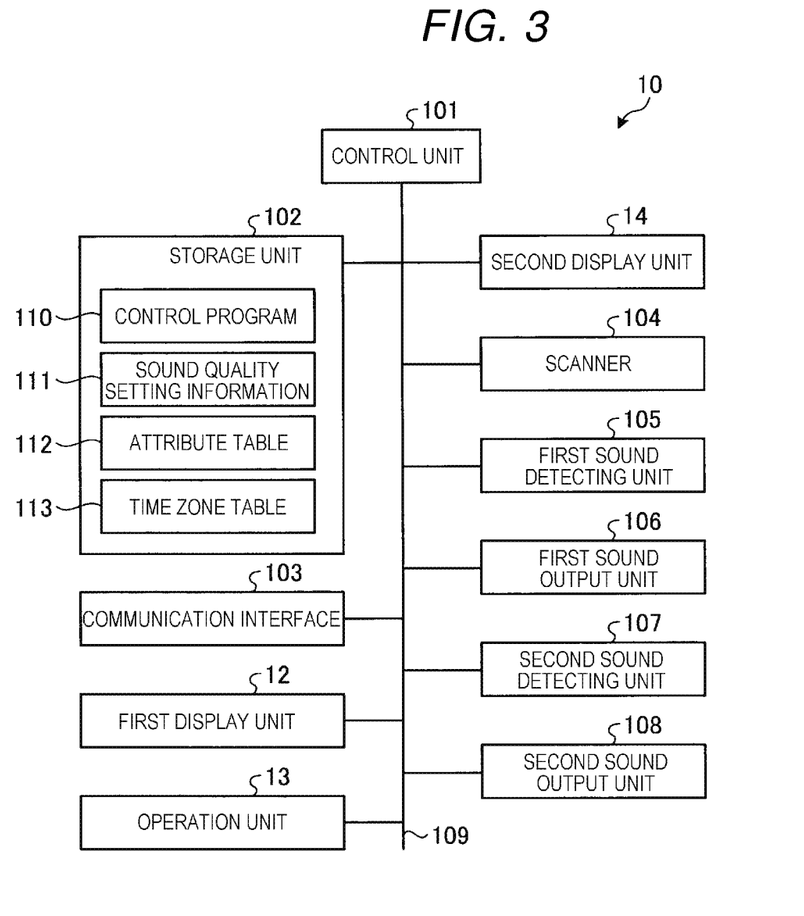
FIG. 3 is a block diagram illustrating an example of a hardware configuration of the commodity registration device.

FIG. 3 is a block diagram illustrating an example of the hardware configuration of the commodity registration device 10. The commodity registration device 10 includes a control unit 101, a storage unit 102, a communication interface 103, the first display unit 12, the operation unit 13, the second display unit 14, the scanner 104, the first sound detecting unit 105, the first sound output unit 106, the second sound detecting unit 107, and the second sound output unit 108. Each unit is mutually connected with each other via a system bus 109 such as a data bus, an address bus, or the like.

The control unit 101 is a computer that controls the entire operations of the commodity registration device 10 and performs various kinds of functions included in the commodity registration device 10. The control unit 101 includes a central processing unit (CPU), a read only memory (ROM), and a random access memory (RAM). The CPU comprehensively controls the operation of the commodity registration device 10. The ROM is a storage medium that stores various programs and data. The RAM is a storage medium that temporarily stores various programs and various data. The CPU executes a program stored in the ROM, the storage unit 102, or the like with the RAM as a work area.

The storage unit 102 is a storage device such as a hard disk drive (HDD) or a solid state drive (SSD). The storage unit 102 stores a control program 110, sound characteristic setting information 111, an attribute table 112, and a time zone table 113.

The control program 110 is a program for causing the operating system or the commodity registration device 10 to perform the function thereof. The control program 110 includes a program for causing characteristic functions according to the embodiment to be performed.

Figure 4:
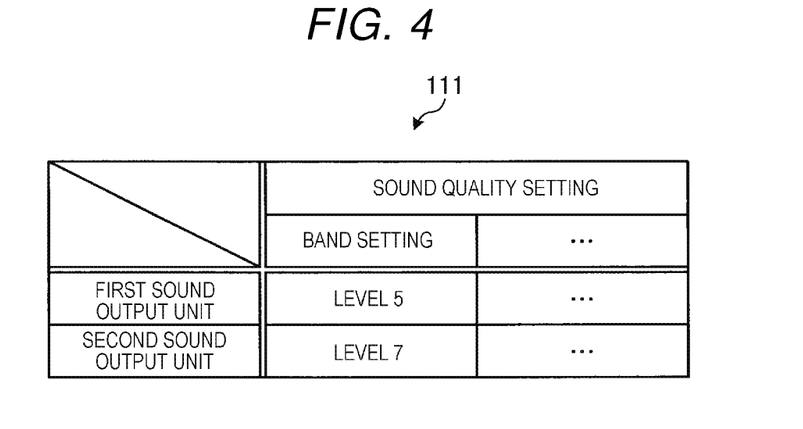
FIG. 4 illustrates an example of a data configuration of sound characteristic setting information.

The sound characteristic setting information 111 stores the characteristic of the sound output from the first sound output unit 106 and the second sound output unit 108. Here, FIG. 4 illustrates an example of a data configuration of the sound characteristic setting information 111. The sound characteristic setting information 111 stores the sound characteristic setting, which is the setting of the characteristic of the sound to be output for each sound output unit such as the first sound output unit 106 and the second sound output unit 108. The sound characteristic setting is the setting on an output form of the sound when outputting the sound data as a sound. For example, the sound characteristic setting includes a band setting, which is the setting on a band (e.g., frequency band) of sound. In the band setting, any one level is set from among high and low levels of a band with a plural of stages. A median value is set as an initial value in the band setting for outputting sound of a standard band. The band setting is set to output sound of a higher band as the level becomes lower than the median value and is set to output sound of a lower band as the level becomes higher than the median value. The sound characteristic setting is not limited to the band setting, but may be set for other sound characteristic items along with the band setting. Alternatively, the sound characteristic setting may be set for other sound characteristic items instead of the band setting. The commodity registration device 10 may be capable of setting a volume, but the sound characteristic setting does not include a volume setting.

Figure 5:
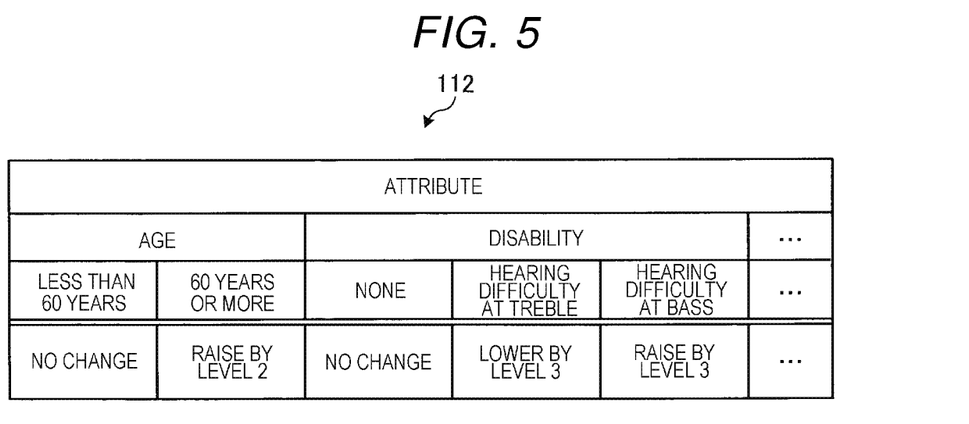
FIG. 5 illustrates an example of a data configuration of an attribute table.

The attribute table 112 is an information table for storing correction modes of the sound characteristic setting according to the attributes of a subject listening to the output sound such as customers, operators, and the like. Here, FIG. 5 illustrates an example of a data configuration of the attribute table 112. The attribute is, for example, age, presence of a hearing disability of a specific band, and the like. The attribute table 112 illustrated in FIG. 5 shows that when the age of the subject is less than 60 years, the level of the band setting is not changed, and when the age of the subject is 60 years or higher, the band setting is raised by level 2. The attribute table 112 illustrated in FIG. 5 shows that the band setting is not changed when the subject has no disability. It shows that when the subject has hearing ability deterioration in the treble band, the band setting is lowered by level 3. It shows that when the subject has hearing ability deterioration in the bass band, the band setting is raised by level 3.

Figure 6:
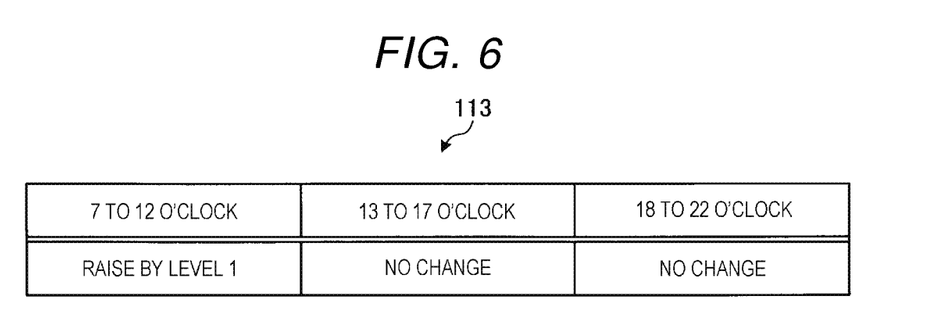
FIG. 6 illustrates an example of a data configuration of a time zone table.

The time zone table 113 is an information table for storing the correction mode of the sound characteristic setting according to the time zone. Here, FIG. 6 illustrates an example of the data configuration of the time zone table 113. The time zone table 113 illustrated in FIG. 6 shows that the band setting is raised by level 1 during 7 AM to 12 PM, the band setting is not changed during 1 PM to 5 PM, and the band setting is not changed during 6 PM to 10 PM.

Returning to FIG. 3, the communication interface 103 controls communication with a device connected via a network.

Figure 7:
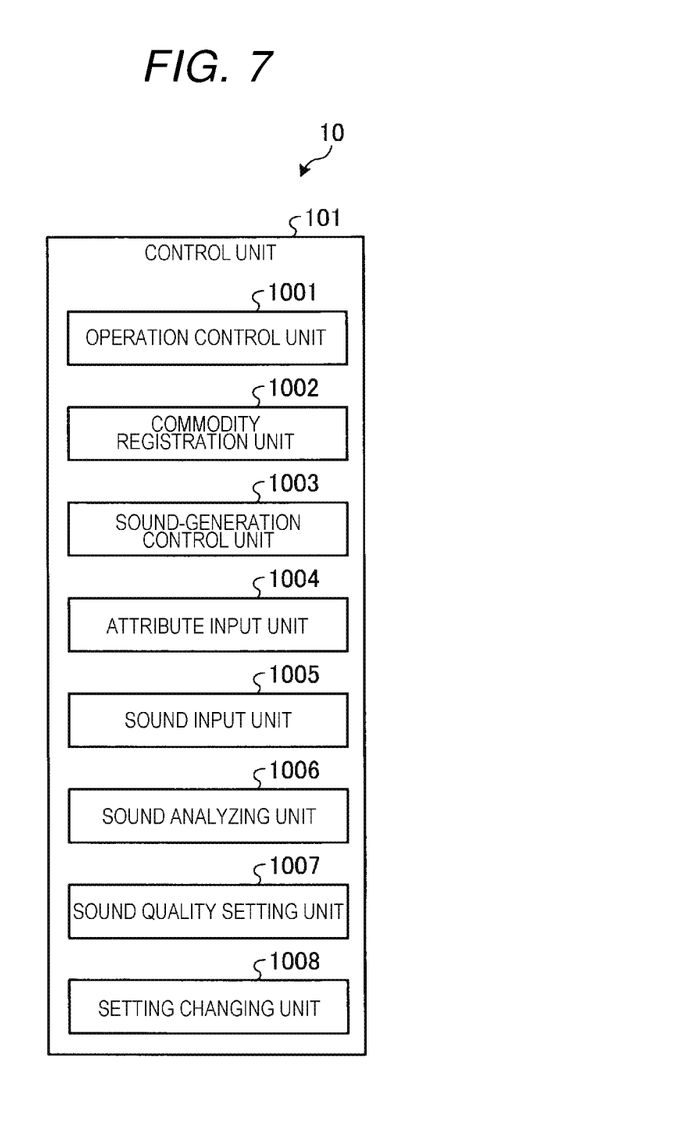
FIG. 7 is a block diagram illustrating an example of a characteristic functional configuration included in the commodity registration device.

Next, the characteristic functions included in the commodity registration device 10 will be described. Here, FIG. 7 is a block diagram illustrating an example of a characteristic functional configuration included in the commodity registration device 10. The control unit 101 of the commodity registration device 10 starts the control program 110 of the storage unit 102 in the RAM and operates according to the control program 110, thereby generating the respective functional units illustrated in FIG. 7 on the RAM. Specifically, the control unit 101 of the commodity registration device 10 serve as functional units, such as an operation control unit 1001, a commodity registration unit 1002, a sound-generation control unit 1003, an attribute input unit 1004, a sound input unit 1005, a sound analyzing unit 1006, a sound characteristic setting unit 1007, and a setting changing unit 1008.

The operation control unit 1001 controls the operation unit 13 to receive various kinds of operations.

The commodity registration unit 1002 controls commodity registration for registering the commodity to be sold to the customer. For example, when the scanner 104 reads the commodity code or when the operation control unit 1001 receives an operation to specify the commodity to be sold, the commodity registration unit 1002 registers the corresponding commodity as a commodity.

The sound-generation control unit 1003 is an example of a sound-generation control unit. The sound-generation control unit 1003 controls the first sound output unit 106 and the second sound output unit 108 to output various kinds of sounds of a characteristic indicated by the sound characteristic setting of the sound characteristic setting information 111. More specifically, when the sound-generation event occurs, the sound-generation control unit 1003 causes any one of or both the first sound output unit 106 and the second sound output unit 108 to output the sound. Here, the sound-generation event is, for example, reception of an operation by the operation control unit 1001, registration of a commodity by the commodity registration unit 1002, satisfaction of notification conditions on various kinds of guidance to the customer, or the like.

When causing the first sound output unit 106 to output sound, the sound-generation control unit 1003 causes sound to be output with a characteristic set according to the sound characteristic setting for the first sound output unit 106 in the sound characteristic setting information 111. When causing the second sound output unit 108 to output sound, the sound-generation control unit 1003 causes sound to be output with a characteristic set according to the sound characteristic setting for the second sound output unit 108 in the sound characteristic setting information 111. That is, the sound-generation control unit 1003 causes sound of a band set according to the band setting in the sound characteristic setting information 111 to be output. The type of the sound caused to be output by the sound-generation control unit 1003 is not limited. For example, the sound caused to be output by the sound-generation control unit 1003 may be a buzzer sound or a message sound of a language.

The attribute input unit 1004 is an example of an input unit. The attribute input unit 1004 receives an input of attributes of the subject such as the customer, the operator, and the like listening to the sound output by the sound-generation control unit 1003. For example, when the scanner 104 reads a customer code in which the attribute of the customer is stored, the attribute input unit 1004 receives the attribute of the customer. When the scanner 104 reads a clerk code in which the attribute of the operator such as the clerk is stored, the attribute input unit 1004 receives the attribute of the operator. An input method of the attribute is not limited the above-described input method. For example, the attribute input unit 1004 may receive the attributes from the various kinds of operations in cooperation with the operation control unit 1001. The attribute input unit 1004 may receive the attribute by communication via the communication interface 103.

The sound input unit 1005 controls the first sound detecting unit 105 and converts the sound around the first opening 16 into an electric signal for every predetermined time. The sound input unit 1005 converts an electric signal into first sound information indicating the sound around the first opening 16 through analog to digital (AD) conversion. Similarly, the sound input unit 1005 controls the second sound detecting unit 107 and converts the sound around the third opening 18 into an electric signal for every predetermined time that passes. The sound input unit 1005 converts an electric signal into second sound information indicating the sound around the third opening 18 through AD conversion.

The sound analyzing unit 1006 is an example of an analyzing unit. The sound analyzing unit 1006 analyzes each of the first sound information and the second sound information generated by the sound input unit 1005 and outputs an analysis result indicating the volume of the ambient sound and the band of the ambient sound. For example, when the sound input unit 1005 generates the first sound information, the sound analyzing unit 1006 analyzes the first sound information. Then, the sound analyzing unit 1006 generates the analysis result indicating the state of the sound around the first opening 16. Similarly, when the sound input unit 1005 generates the second sound information, the sound analyzing unit 1006 analyzes the second sound information. Then, the sound analyzing unit 1006 generates the analysis result indicating the state of the sound around the third opening 18.

The sound characteristic setting unit 1007 is an example of a setting unit. The sound characteristic setting unit 1007 sets the characteristic of the sound to be output from the first sound output unit 106 and the second sound output unit 108 in the sound characteristic setting information 111. For example, the sound characteristic setting unit 1007 sets the sound characteristic according to the analysis result of the sound analyzing unit 1006, the attribute received by the attribute input unit 1004, and the time zone stored in the time zone table 113 in the sound characteristic setting information 111.

More specifically, when the analysis result indicating the state of the sound around the first opening 16 is generated, the sound characteristic setting unit 1007 sets the sound characteristic according to the analysis result as the sound characteristic setting of the first sound output unit 106 in the sound characteristic setting information 111. For example, the sound characteristic setting unit 1007 sets the band different from the band of the sound around the first opening 16 as the sound characteristic setting on a condition that the volume of the ambient sound indicated by the analysis result is equal to or greater than a threshold. When the band is raised in advance, for example, the sound characteristic setting unit 1007 sets the higher band compared to the band of the sound around the first opening 16 as the sound characteristic setting. When the band is lowered in advance, for example, the sound characteristic setting unit 1007 sets the lower band compared to the band of the sound around the first opening 16 as the sound characteristic setting.

When the attribute input unit 1004 receives the attribute of the operator, the sound characteristic setting unit 1007 corrects the sound characteristic setting of the first sound output unit 106 according to the correction mode corresponding to the attribute input in the attribute table 112. When the time zone stored in the time zone table 113 is reached, the sound characteristic setting unit 1007 corrects the sound characteristic setting of the first sound output unit 106 according to the correction mode corresponding to the current time zone in the attribute table 112.

Similar to the sound characteristic setting for the first sound output unit 106, when the analysis result indicating the state of the sound around the third opening 18 is generated, the sound characteristic setting unit 1007 sets the sound characteristic according to the analysis result as the sound characteristic setting of the second sound output unit 108 in the sound characteristic setting information 111. When the attribute input unit 1004 receives the attribute of the customer, the sound characteristic setting unit 1007 corrects the sound characteristic setting of the second sound output unit 108 according to the correction mode corresponding to the attribute input in the attribute table 112. When the time zone stored in the time zone table 113 is reached, the sound characteristic setting unit 1007 corrects the sound characteristic setting of the second sound output unit 108 according to the correction mode corresponding to the current time zone in the attribute table 112.

The setting changing unit 1008 changes the setting of the sound characteristic such as the sound characteristic setting information 111, the attribute table 112, and the time zone table 113. For example, based on the operation received by the operation control unit 1001, the setting changing unit 1008 may change the setting of the sound characteristic designated by the operation, or based on the information received by the communication interface 103, the setting changing unit 1008 may change the setting of the sound characteristic designated by the received information.

Figure 8:
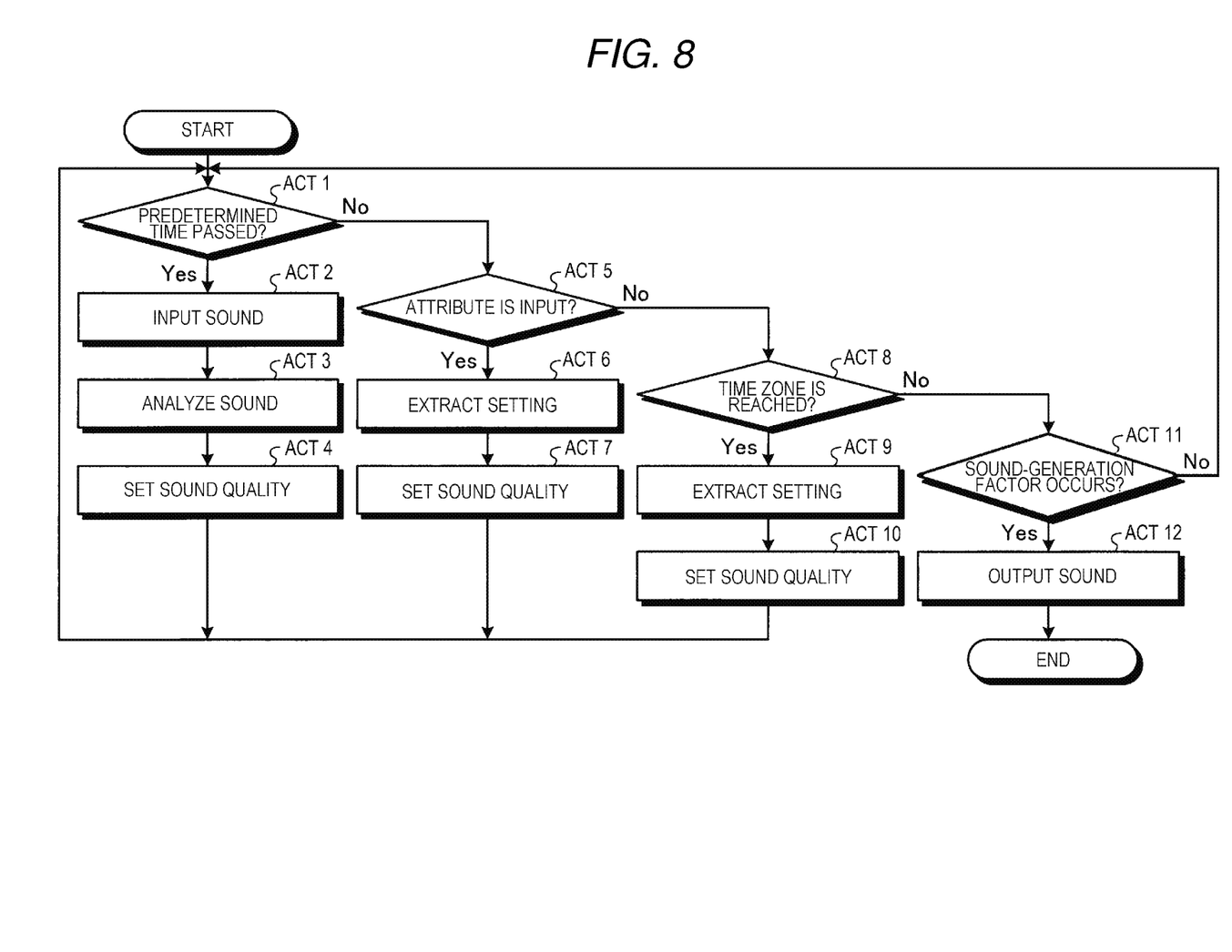
FIG. 8 is a flowchart illustrating an example of sound characteristic setting executed by the commodity registration device.

Next, sound characteristic setting executed by the commodity registration device 10 will be described. Here, FIG. 8 is a flowchart illustrating an example of the sound characteristic setting executed by the commodity registration device 10 according to the embodiment.

The sound input unit 1005 determines whether or not a predetermined time passed after receiving an input of a previous sound (Act 1). When it is determined that the predetermined time passed (Act 1; Yes), the sound input unit 1005 operates to receive an input of a sound (Act 2).

The sound analyzing unit 1006 analyzes the input sound (Act 3). The sound characteristic setting unit 1007 sets the sound characteristic according to the analysis result of the sound in the sound characteristic setting information 111 (Act 4). That is, the sound characteristic setting unit 1007 sets the sound characteristic according to the analysis result of the sound input from the first sound detecting unit 105 as the sound characteristic setting of the first sound output unit 106 in the sound characteristic setting information 111. The sound characteristic setting unit 1007 sets the sound characteristic according to the analysis result of the sound input from the second sound detecting unit 107 as the sound characteristic setting of the second sound output unit 108 in the sound characteristic setting information 111. Then, the process proceeds to Act 1.

When it is determined that the predetermined time did not pass in Act 1 (Act 1; No), the attribute input unit 1004 determines whether or not the attribute of the operator, customer, or the like is input (Act 5).

When it is determined that the attribute is input (Act 5; Yes), the sound characteristic setting unit 1007 extracts a correction mode corresponding to the input attribute from the attribute table 112 (Act 6).

The sound characteristic setting unit 1007 corrects the sound characteristic setting in the sound characteristic setting information 111 according to the correction mode extracted from the attribute table 112 (Act 7). That is, when the attribute of the operator is input, the sound characteristic setting unit 1007 corrects the sound characteristic setting of the first sound output unit 106 in the sound characteristic setting information 111. On the other hand, when the attribute of the customer is input, the sound characteristic setting unit 1007 corrects the sound characteristic setting on the second sound output unit 108 in the sound characteristic setting information 111. Then, the process proceeds to Act 1.

When it is determined that the attribute is not input in Act 5 (Act 5; No), the sound characteristic setting unit 1007 determines whether or not the current time reached the time zone set in the time zone table 113 (Act 8).

When it is determined that the current time reached the set time zone (Act 8; Yes), the sound characteristic setting unit 1007 extracts a correction mode corresponding to the current time from the time zone table 113 (Act 9). The sound characteristic setting unit 1007 corrects the sound characteristic setting in the sound characteristic setting information 111 according to the correction mode extracted from the time zone table 113 (Act 10). Then, the process proceeds to Act 1.

When it is determined that the current time has not reached the set time zone in Act 8 (Act 8; No), the sound-generation control unit 1003 determines whether or not the sound-generation event occurred (Act 11). When it is determined that the sound-generation event has not occurred (Act 11; No), the process proceeds to Act 1.

When it is determined that the sound-generation event has occurred (Act 11; Yes), the sound-generation control unit 1003 causes sound to be output with the characteristic according to the setting in the sound characteristic setting information 111 (Act 12). That is, when causing the first sound output unit 106 to output the sound, the sound-generation control unit 1003 causes the sound to be output with the characteristic according to the sound characteristic setting of the first sound output unit 106 in the sound characteristic setting information 111. On the other hand, when causing the second sound output unit 108 to output the sound, the sound-generation control unit 1003 causes the sound to be output with the characteristic according to the sound characteristic setting of the second sound output unit 108 in the sound characteristic setting information 111.

In the manner described above, the commodity registration device 10 completes the sound characteristic setting.

As described above, the commodity registration device 10 according to the embodiment analyzes the sound captured by the first sound detecting unit 105 or the second sound detecting unit 107, and sets the sound characteristic according to the analysis result in the sound characteristic setting information 111. Then, the commodity registration device 10 causes the first sound output unit 106 and the second sound output unit 108 to output sound with the characteristic set in the sound characteristic setting information 111. Accordingly, the commodity registration device 10 according to the embodiment can change the sound characteristic corresponding to the ambient noise.

While some embodiments of the present invention have been described, these embodiments are merely examples, and are not intended to limit the scope of the invention. These novel embodiments may be implemented in various other forms, and various omissions, replacements, and modifications may be made without departing from the scope and spirit of the invention. These embodiments and the modifications are included in the scope and spirit of the invention, and are included in the invention described in the claims and their equivalents.

In the embodiment, an example of the sound characteristic control apparatus applied to the commodity registration device 10 was explained. However, the sound characteristic control apparatus is applicable to various devices which output sound. For example, the sound characteristic control apparatus can also be applied to the POS terminal 20, a self-service POS terminal which the customer operates commodity registration and accounting, a semi-self-service POS terminal which the customer operates accounting, and the like.

In the embodiment, the first sound detecting unit 105 and the first sound output unit 106 are associated one to one. Also, the second sound detecting unit 107 and the second sound output unit 108 are associated one to one. However, a plurality of sound output units may be associated with one sound detecting unit, one sound output unit may be associated with a plurality of sound detecting units, or a plurality of sound output units may be associated with a plurality of sound detecting units.

In the embodiment, the band of the sound was described as an example of the sound characteristic setting. The commodity registration device 10 is not limited to changing the band of the entire sound, but may change the band of a specific band portion in the entire sound. The sound characteristic setting is not limited to changing the band, but may include a change in sound pressure. The commodity registration device 10 may be capable of setting the volume, but sound setting does not include volume setting.

A program to be executed by various apparatuses of the embodiments and the modifications is provided by being incorporated in advance in a storage medium (ROM or storage unit) included in each apparatus, but is not limited thereto. For example, the program may be provided as a file in an installable format or in an executable format by being recorded in a computer-readable recording medium such as a CD-ROM, a flexible disk (FD), a CD-R, a digital versatile disk (DVD), and the like. The storage medium is not limited to a medium independent from a computer or an embedded system, but includes a storage medium in which a program transmitted through LAN, the Internet, or the like is downloaded and stored or temporarily stored.

A program to be executed by the apparatuses of the embodiments or the modifications may be stored in a computer connected to a network such as the Internet to be provided by being downloaded via the network, or may be provided or distributed via a network such as the Internet.

What is claimed is:

1. An audio signal control apparatus comprising:
    a sound input circuit configured to receive an ambient sound signal from a microphone that captures ambient sound;
    a sound output circuit configured to generate an output sound signal and transmit the output sound signal to a speaker to generate sound based on the output sound signal;
    memory storing a table indicating a relationship among frequency bands and time zones during a day; and
    a control circuit configured to:
        determine characteristics of the ambient sound based on the ambient sound signal received by the sound input circuit,
        determine a time zone during a day,
        determine a frequency band of the sound to be generated by the speaker based on the characteristics of the ambient sound and by referring to the table in the memory using the determined time zone, and
        control the sound output circuit to generate an output sound signal corresponding to the sound of the determined frequency band.

2. The audio signal control apparatus according to claim 1, further comprising:
    an attribute input circuit configured to receive a user input indicating one or more attributes of an object to which the sound is to be directed, wherein
    the control circuit is further configured to determine the frequency band of the sound to be generated based on the attribute of the object indicated by the user input.

3. The audio signal control apparatus according to claim 2, wherein the object is a customer, and the one or more attributes of the object include an age of the customer.

4. The audio signal control apparatus according to claim 2, wherein the object is a customer, and the one or more attributes of the object include a low-frequency-band hearing disability of the customer.

5. The audio signal control apparatus according to claim 2, wherein the object is a customer, and the one or more attributes of the object include a high-frequency-band hearing disability of the customer.

6. The audio signal control apparatus according to claim 2, further comprising:
    memory storing a table indicating a relationship among the frequency band and the one or more attributes of the object, wherein
    the control circuit is configured to determine the frequency band of the sound to be generated by referring to the table in the memory.

7. The audio signal control apparatus according to claim 1, wherein
    the control circuit is configured to control the sound input circuit to receive the ambient sound signal after a predetermined time period since last reception of an ambient sound signal.

8. The audio signal control apparatus according to claim 1, wherein the control circuit determines the frequency band of the sound to be generated by the speaker to be different from a frequency band of the ambient sound.

9. A point-of-sale (POS) system comprising:
a main body;
a code scanner disposed at a window of the main body;
a first microphone and a first speaker directed to a first side of the main body;
a second microphone and a second speaker directed to a second side of the main body opposite to the first side; and
an audio signal controller disposed in the main body and including:
  a sound input circuit configured to receive a first ambient sound signal corresponding to a first ambient sound captured by the first microphone and a second ambient sound signal corresponding to a second ambient sound captured by the second microphone;
  a sound output circuit configured to generate a first output sound signal and transmit the first output sound signal to the first speaker to generate a first sound based on the first output sound signal, and generate a second output sound signal and transmit the second output sound signal to the second speaker to generate a second sound based on the second output sound signal; and
  a control circuit configured to:
    determine characteristics of the first ambient sound based on the first ambient sound signal received by the sound input circuit,
    determine a frequency band of the first sound to be generated by the first speaker based on the characteristics of the first ambient sound,
    control the sound output circuit to generate the first output sound signal corresponding to the first sound of the determined frequency band,
    determine characteristics of the second ambient sound based on the second ambient sound signal received by the sound input circuit,
    determine a frequency band of the second sound to be generated by the second speaker based on the characteristics of the second ambient sound, and
    control the sound output circuit to generate the second output sound signal corresponding to the second sound of the determined frequency band.

10. The POS system according to claim 9, wherein the first microphone and the first speaker are directed to a side of the main body opposite to a side on which the code scanner is disposed.

11. The POS system according to claim 9, wherein the control circuit is further configured to control the frequency band of the second sound to be different from the frequency band of the first sound.

12. A method for sound control comprising:
receiving an ambient sound signal from a microphone that captures ambient sound;
determining characteristics of the ambient sound based on the ambient sound signal received by the sound input circuit;
determining a time zone during a day;
determining a frequency band of sound to be generated by a speaker based on the characteristics of the ambient sound and by referring to a table in memory that indicates a relationship among frequency bands and time zones during a day;
generating an output sound signal corresponding to the sound of the determined frequency band; and
transmitting the output sound signal to the speaker to generate the sound based on the output sound signal.

13. The method according to claim 12, further comprising:
receiving a user input indicating one or more attributes of an object to which the sound is to be directed, wherein the frequency band of the sound to be generated by the speaker is also determined based on the attribute of the object indicated by the user input.

14. The method according to claim 13, wherein the object is a customer, and the one or more attributes of the object include an age of the customer.

15. The method according to claim 13, wherein the object is a customer, and the one or more attributes of the object include a low-frequency-band hearing disability of the customer.

16. The method according to claim 13, wherein the object is a customer, and the one or more attributes of the object include a high-frequency-band hearing disability of the customer.

17. The POS system according to claim 9, further comprising:
memory storing a table indicating a relationship among frequency bands and time zones during a day, wherein the control circuit is further configured to:
  determine a time zone during a day, and
  determine the frequency band of the first sound to be generated by the first speaker also by referring to the table in the memory using the determined time zone.

18. The POS system according to claim 17, wherein the control circuit is further configured to determine the frequency band of the second sound to be generated by the second speaker also by referring to the table in the memory using the determined time zone.

19. The POS system according to claim 9, wherein the audio signal controller further includes an attribute input circuit configured to receive a user input indicating one or more attributes of an object to which the first sound is to be directed, and
the control circuit is further configured to determine the frequency band of the first sound to be generated based on the attribute of the object indicated by the user input.

20. The POS system according to claim 19, wherein the object is a customer, and the one or more attributes of the object include an age of the customer.

* * * * *